(12) United States Patent
Roshandel et al.

(10) Patent No.: US 9,796,441 B1
(45) Date of Patent: Oct. 24, 2017

(54) SAFETY DEVICE TO ENABLE HORN SWITCH TO ACTIVATE HORN AND HAZARD LIGHTS AND METHOD THEREOF

(71) Applicants: Mike Roshandel, Hasbrouck Heights, NJ (US); Victor DeVito, Toms River, NJ (US)

(72) Inventors: Mike Roshandel, Hasbrouck Heights, NJ (US); Victor DeVito, Toms River, NJ (US)

( * ) Notice: Subject to any disclaimer, the term of this patent is extended or adjusted under 35 U.S.C. 154(b) by 0 days.

(21) Appl. No.: 15/414,882

(22) Filed: Jan. 25, 2017

(51) Int. Cl.
| | | |
|---|---|---|
| *B60Q 1/52* | (2006.01) | |
| *B62J 6/00* | (2006.01) | |
| *B62J 3/00* | (2006.01) | |
| *B62J 27/00* | (2006.01) | |
| *B60C 9/00* | (2006.01) | |

(52) U.S. Cl.
CPC .............. *B62J 6/001* (2013.01); *B62J 3/00* (2013.01); *B62J 27/00* (2013.01); *B60C 9/00* (2013.01); *B62J 2300/002* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,262,277 | A * | 4/1981 | Abonia ................... | B60Q 1/52 315/82 |
| 8,003,902 | B1 * | 8/2011 | Cannella ................. | B60Q 1/46 200/1 B |
| 8,581,126 | B1 * | 11/2013 | Cannella ............. | B60Q 1/0082 200/1 B |
| 2016/0355179 | A1 * | 12/2016 | Cannella ................... | B60T 7/22 |

* cited by examiner

*Primary Examiner* — Travis Hunnings
(74) *Attorney, Agent, or Firm* — The Iwashko Law Firm, PLLC; Lev Ivan Gabriel Iwashko (57) ABSTRACT

A safety device and a safety method are usable with a motorcycle having a horn assembly and a hazard light assembly. The safety device includes a detection module and a hazard control module. The detection module may detect the activation of the horn assembly by an engagement of a horn switch of the horn assembly by a user and provide a trigger to activate the hazard control module. The hazard control module may place hazard lights of the hazard light assembly in an on state for a duration period in response to an activation of the horn assembly. The hazard control module may also automatically place the plurality of hazard lights in an off state at an end of the duration period.

15 Claims, 10 Drawing Sheets

SAFETY DEVICE TO ENABLE HORN SWITCH TO ACTIVATE HORN AND HAZARD LIGHTS AND METHOD THEREOF

BACKGROUND

Motor vehicles such as motorcycles and automobiles include visual signal devices and audio warning devices for navigational safety. Visual signal devices may include brake lights, left turn signal lights, right turn signal lights, and hazard lights. Audio warning devices may include a horn to emit an audible sound.

BRIEF DESCRIPTION OF THE DRAWINGS

Non-limiting examples are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

DETAILED DESCRIPTION

Motor vehicles such as motorcycles and automobiles are used in transportation for business, recreation, and personal purposes. On a daily basis, vast numbers of motor vehicles share the roads and other areas with each. Generally, motor vehicles have audio warning devices and visual signal devices to increase the safety in the use thereof. Such audio warning devices may include a horn to emit an audible sound. Such visual signal devices may include brake lights, left turn signal lights, right turn signal lights, and hazard lights (e, g., simultaneous flashing of the left and right turn signal lights). Typically, hazard lights are a set of four light assemblies respectively placed at the front left-side, rear left-side, front right-side, and rear right-side of the motor vehicle that all light up in a predetermined flashing sequence when placed in an on state and all go off when placed in an off state.

Traditionally, a user places the hazard lights in the on state by pushing a hazard switch and in the off state based on a subsequent pushing of the hazard switch. Even with the traditional use of existing motor vehicles' audio warning devices and visual signal devices, numerous emergency and accidental events occur daily. With the increased popularity and demands of motor vehicle transportation, enhanced safety features and distraction reductions in the operation of motor vehicles is warranted. Enhanced safety features to increase vehicle visibility and reduce distractive driving are particularly welcome for motor vehicles such as motorcycles which require a driver to possess keen skills and constant focus in the stabilization and control of the bike.

In examples, a safety device and a safety method are disclosed. The safety device includes a detection module and a hazard control module. The detection module detects the activation of the horn assembly by an engagement of a horn switch of the horn assembly by a user. In response, the detection module provides a trigger signal to activate the hazard control module. As such, the hazard control module places hazard lights of the hazard light assembly in an on state for a duration period in response to an activation of the horn assembly. Thus, an engagement of the horn switch by the user results in, both, an immediate audio alert from the horn and a visual alert from the hazard lights using the existing horn and hazard lights of the motorcycle. That is, during an on state, the hazard lights are turn on in accordance with a respective flashing sequence.

Further, the hazard control module also automatically places the hazard lights in an off state at an end of the duration period without further manual intervention by the user. Thus, the motorcycle driver can continually use both hands driving the motorcycle and continue to focus on the emergency situation at hand without a further need to subsequently engage the hazard switch. Accordingly, the safety device may communicate with the existing horn assembly and hazard light assembly to provide enhanced safety features and reduce driving distractions in the operation of motorcycles in a cost effective manner.

Figure 1:
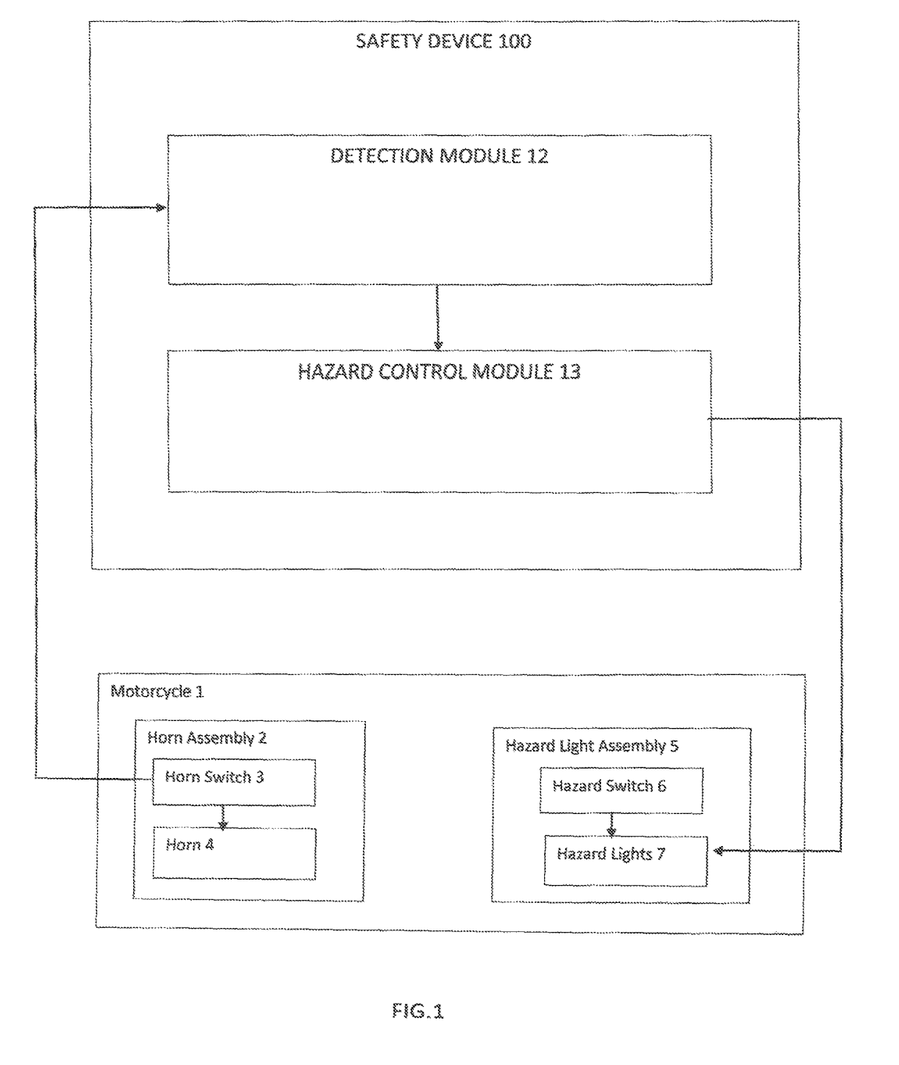
FIG. 1 is a block diagram illustrating a safety device usable with a motorcycle according to an example.

FIG. 1 is a block diagram illustrating a safety device usable with a motorcycle according to an example. Referring to FIG. 1, a safety device 100 is usable with a motorcycle 1 having a horn assembly 2 and a hazard light assembly 5. The safety device 100 includes a detection module 12 and a hazard control module 13. The detection module 12 detects the activation of the horn assembly 2 by an engagement of a horn switch 3 of the horn assembly 2 by a user. In addition, the detection module 12 provides a trigger signal to activate the hazard control module 13. The horn switch 3 may be engaged, for example, by the user such as a motorcycle driver pressing the horn switch 3 in response to an immediate and/or potential emergency condition.

Referring to FIG. 1, the hazard control module 13 places hazard lights 7 of the hazard light assembly 5 in an on state for a duration period in response to an activation of the horn assembly 2. During an on state, the hazard lights 7 are turned on and illuminated in accordance with a respective flashing sequence. That is, in response to the horn switch 3 being pressed by a motorcycle driver, the horn 4 provides an audible sound and the hazard lights 7 light up. Thus, a single push on the horn switch 3 results in, both, an audible alert and a visual alert from the motorcycle 1 to others, as well as, automatically placing the hazard lights 7 in an off state at an end of the duration period. During an off state, the respective flashing sequence of the hazard lights 7 is terminated and the hazard lights 7 are turned off.

That is, when the duration period initiated by an engagement of the horn switch 3 by the user is over, the hazard lights 7 are placed in an off state without further intervention by the user. Thus, the motorcycle driver can continue to use both hands to operate the motorcycle 1 and continue to focus on the emergency situation at hand without a further need to engage the hazard switch 6 and managing light status.

In some examples, the detection module 12 and/or hazard control module 13 may be implemented in hardware, software including firmware, or combinations thereof. The firmware, for example, may be stored in memory and executed by a suitable instruction-execution system. If implemented in hardware, as in an alternative example, the detection module 12 and/or hazard control module 13 may be implemented with any or a combination of technologies which are well known in the art (for example, discrete-logic circuits, application-specific integrated circuits (ASICs), programmable-gate arrays (PGAs), field-programmable gate arrays (FPGAs)), and/or other later developed technologies. In some examples, the detection module 12 and/or hazard control module 13 may be implemented in a combination of software and data executed and stored under the control of a computing device.

Figure 2:
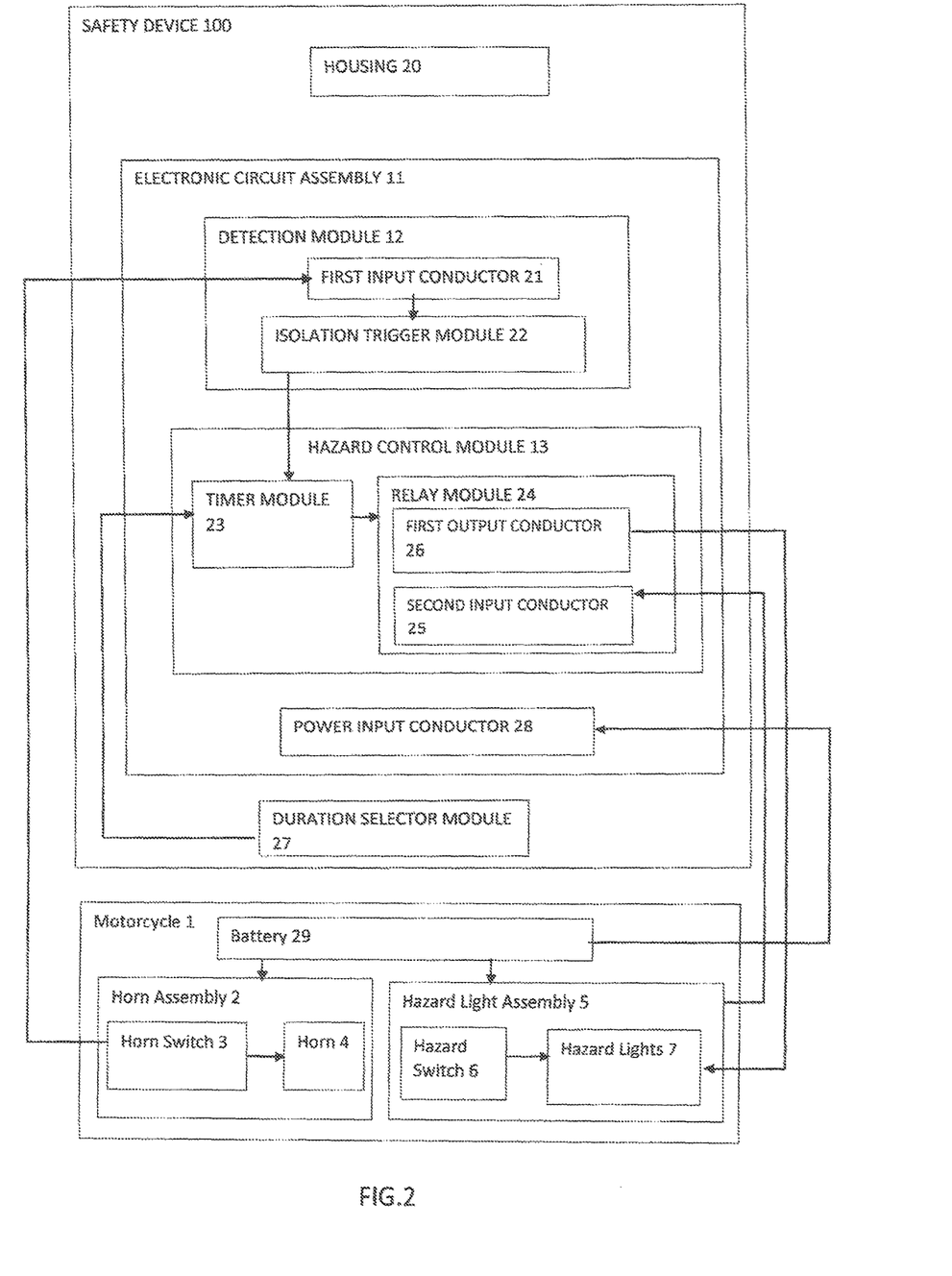
FIG. 2 is a block diagram illustrating the safety device of FIG. 1 according to another example.

FIG. 2 is a block diagram illustrating the safety device of FIG. 1 according to another example. Referring to FIG. 2, in some examples, a safety device 100 may include a housing 20, an electronic circuit assembly 11, and a duration selector module 27. In some examples, the housing 20 attaches to the motorcycle 1 and the electronic circuit assembly 11 is disposed in the housing 20. The electronic circuit assembly 11 may include a substrate with electronic components formed and/or attached thereon such as a printed circuit board, printed circuit assembly, and the like. The duration selector module 27 may include a plurality of duration states selectable by the user in which each duration state corresponds to a specific amount of time for the duration period. The duration selector module 27 may provide a respective duration state to the electronic circuit assembly 11 such as a timer module 23 thereon. In some examples, at least one of the duration states selectable by the user may cause the hazard lights 7 to flash as a one-time burst of light. That is, the respective hazard lights 7 would flash once and the respective flashing sequence would be terminated.

Referring to FIG. 2, in some examples, the electronic circuit assembly 11 includes a power input conductor 28, a detection module 12, and a hazard control module 13. The power input conductor 28 may receive power from a battery 29 of the motorcycle 1 to provide power to the electric circuit assembly 11. The battery 29 may also provide power to the motorcycle 1 including the horn assembly 2 and hazard light assembly 5. In some examples, the safety device 100 may also include a manual switch (not illustrated) to selectively connect and disconnect power to the electric circuit assembly 11 to place the safety device 100 in an operational mode and a non-operational mode, respectively. For example, in the operational mode, the safety device 100 is able to receive a horn signal to turn on to illuminate the hazard lights 7 and to automatically turn off the hazard lights 7. Alternatively, in the non-operational mode, the safety device 100 is shut-off and the horn switch 3 and hazard switch 6 function in the traditional manner. That's is, in the non-operational mode, the horn switch 3 turns on the horn 4 without turning on the hazard lights 7, and the hazard switch 6 turns on and, subsequently, turns off the hazard lights 7. Also, in some examples, the horn switch 3 may send a signal to a processor which communicates with the horn 4 to enable the horn 4 to emit the audible sound in the operational and/or non-operational mode.

Referring to FIG. 2, in some examples, the detection module 12 includes a first input conductor 21 and an isolation trigger module 22. The first input conductor 21 may connect the isolation trigger module 22 to the hazard light assembly 5. In operation, the first input conductor 21 receives a horn signal based on the activation of the horn assembly 2 by the engagement of the horn switch 3 by the user. The isolation trigger module 22 provides a respective trigger signal, such as an isolation trigger signal, to activate the hazard control module 13 in response to the horn signal being received there of. The isolation trigger module 22 also reduces a false activation of the hazard light assembly 5.

Referring to FIG. 2, in some examples, the hazard control module 13 includes a timer module 23 and a relay module 24. The timer module 23 may receive the isolation trigger signal from the isolation trigger module 22. The timer module 23 provides a respective trigger signal, such as a timer trigger signal having a duration period, to the relay module 24. The relay module 24 may include a second input conductor 25 and a first output conductor 26. The relay module 24 places the hazard lights 7 in the on state in response to the timer trigger signal of the timer module 23. For example, the second input conductor 25 may receive a flashing signal from the hazard light assembly 5. Consequently, the first output conductor 26 may place the hazard lights 7 in the on state in response to the timer trigger signal and the flashing signal. In some examples, the first output conductor 26 has two terminals to respectively connect to the hazard lights.

In some examples, an audible sound of the horn 4 is configured to occur simultaneously with the on state of the hazard lights 7 during at least a portion of the duration period in response to the activation of the horn switch 3. Thus, an engagement of the horn switch 3 by the user results in, both, an immediate audio alert from the horn 4 and a visual alert from the hazard lights 7 using the existing horn 4 and hazard lights 7 of the motorcycle 1. Moreover, in this enhanced alerted state, other drivers that approach the motorcycle 1 from various directions may be alerted to the presence of the motorcycle 1 as the hazard lights 7 are typically disposed at the left front-side, right front-side, left back-end and right back-end of the motorcycle 1. The relay module 24 also automatically places the hazard lights 7 in the off state in response to the end of the duration period. For example, the first output conductor 26 may also automatically place the hazard lights 7 in the off state at the end of the duration period. Thus, light status management and additional intervention by the user to shut off the hazard lights 7 is not required as it occurs automatically.

In some examples, the detection module 12, hazard control module 13, and/or duration selector module 27 may be implemented in hardware, software including firmware, or combinations thereof. The firmware, for example, may be stored in memory and executed by a suitable instruction-execution system. If implemented in hardware, as in an alternative example, the detection module 12, hazard control module 13 and/or duration selector module 27 may be implemented with any or a combination of technologies which are well known in the art (for example, discrete-logic circuits, application-specific integrated circuits (ASICs), programmable-gate arrays (PGAs), field-programmable gate arrays (FPGAs)), and/or other later developed technologies. In some examples, the detection module 12, hazard control module 13, and/or duration selector module 27 may be implemented in a combination of software and data executed and stored under the control of a computing device.

Figure 3:
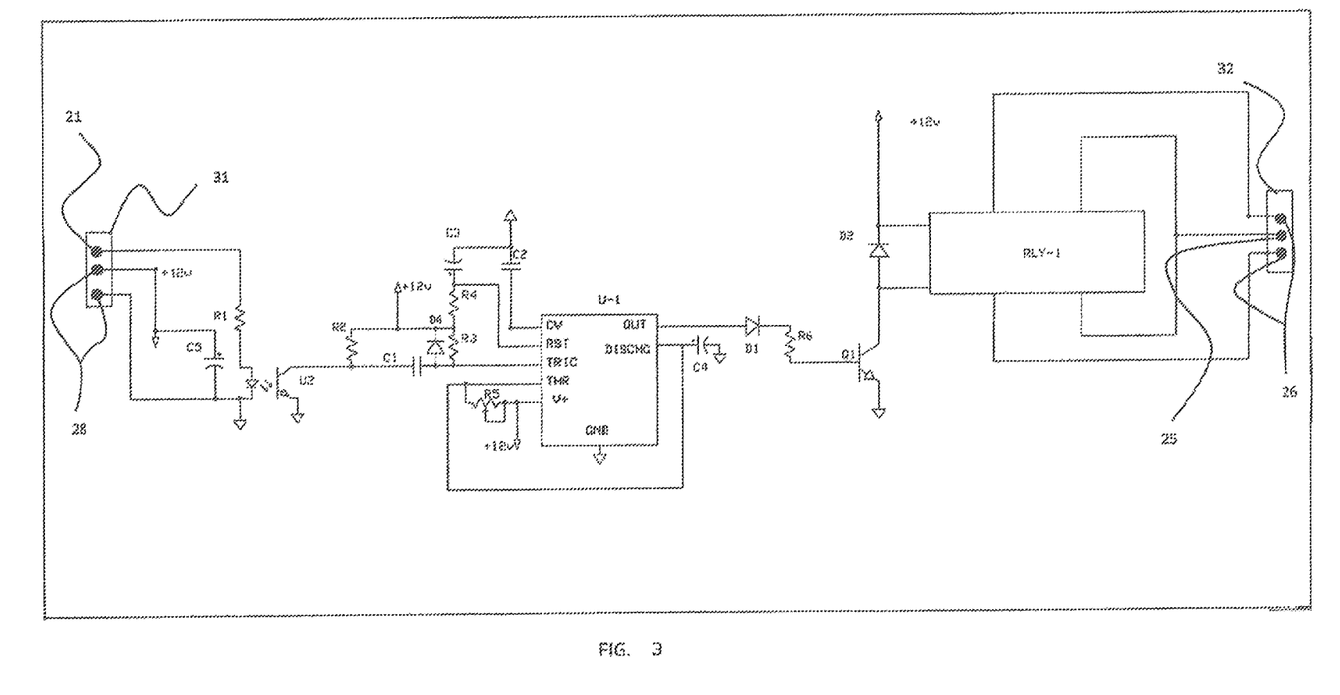
FIG. 3 is a schematic view illustrating an electronic circuit assembly including an electronic circuit of the safety device of FIG. 2 according to an example.

FIG. 3 is a schematic view illustrating an electronic circuit assembly including an electronic circuit of the safety device of FIG. 2 according to an example. Referring to FIGS. 2-3, in some examples, the electronic circuit assembly 11 includes a power input conductor 28, a detection module 12, and a hazard control module 13. The detection module 12 may include a first input conductor 21 and an isolation trigger module 22. The first input conductor 21 and the power input conductor 28 may be in the form of an input port 31 to communicate with the motorcycle 1. For example, the first input conductor 21 may communicate with the horn switch 3, and the power input conductor 28 may communicate with the battery 29 of the motorcycle 1. That is, the first input conductor 21 may receive a horn signal in response to an engagement of the horn switch 3 by a user. The power input conductor 28 may receive power from the battery 29 to power the electronic circuit assembly 11. The battery 29 may also provide power to the horn assembly 2 and hazard light assembly 5 of the motorcycle 1.

Referring to FIGS. 2-3, the isolation trigger module 22 may include resistors R1, R2, and R3, a capacitor C1, a diode D4 and a photo-coupler IC U2. Photo-coupler IC U2 is turned on by a current established through resistor R1 in response to a horn signal provided thereto based on the engagement of the horn switch 3 by a user. In the on state, the photo-coupler IC U2 discharges capacitor C1 and, as a result, changes the state of trigger input pin TRIG of the timer integrated circuit (IC) U-1 from high to low. In other words, the isolation trigger module 22 provides an isolation trigger signal to activate the timer IC U-1. Resistors R2 and R3 and diode D2 enable proper triggering of the timer IC U-1 at the trigger input pin TRIG. In order to reduce false triggering from noise and/or false signals, amongst other things, the photo-coupler IC U2 requires a minimum voltage to turn on.

Referring to FIGS. 2-3, the hazard control module 13 may include a timer module 23 and a relay module 24. The timer module 23 may include a timer integrated circuit (IC) U-1, a resistor R4, a variable resistor R5, and capacitors C2, C3, C4, and C5. Capacitor C2 may maintain the predetermined voltage constant at the control voltage pin (CV) of the timer IC U-1. Capacitor C3 and resistor R4 may maintain the predetermined voltage constant at the reset pin RST of the timer IC U-1. C5 may maintain proper ground at the ground pin GND of the timer IC U-1. Capacitor C4 and variable resistor R5 set a duration period of a timer trigger signal provided from the timer IC U-1. In an example, a resistance of variable resistor R5 may be adjusted by a user to change the setting of the duration period, for example, through a duration selector module 27. Timer IC U-1 may include a voltage pin (V+) to receive a supply voltage, a threshold pin THR to monitor voltage across capacitor C4, and discharge pin DCHG to discharge capacitor C4. The threshold pin THR and discharge pin DCHG may be connected to each other.

Referring to FIGS. 2-3, the relay module 24 may include a resistor R6, a transistor Q1, diodes D1 and D2, a relay RLY-1, a first output conductor 26 and a second input conductor 25. Resistor R6, transistor Q1, and diode D1 may form a relay driver. The relay driver may include transistor Q1 to selectively activate relay RLY-1 in response to the timer trigger signal from the timer IC U-1 and include diode D1 to prevent unwanted current from traveling upstream from the transistor Q1 to interfere with the timer IC U-1. Diode D2 may prevent false activation of the relay RLY-1. The capacitors may include ceramic capacitors, electrolytic capacitor, and the like.

Referring to FIGS. 2-3, the first output conductor 26 and the second input conductor 25 may be in the form of an input/output port 32 to communicate with the motorcycle 1. For example, the first output conductor 26 and the second input conductor 25 may communicate with the hazard light assembly 5 of the motorcycle 1. That is, the second input conductor 25 may receive a pulse train signal from a turn signal relay of the hazard light assembly 5 and the first output conductor 26 may provide the pulse train signal to the hazard lights 7 in response to an activation of the relay RLY-1.

Figure 4:
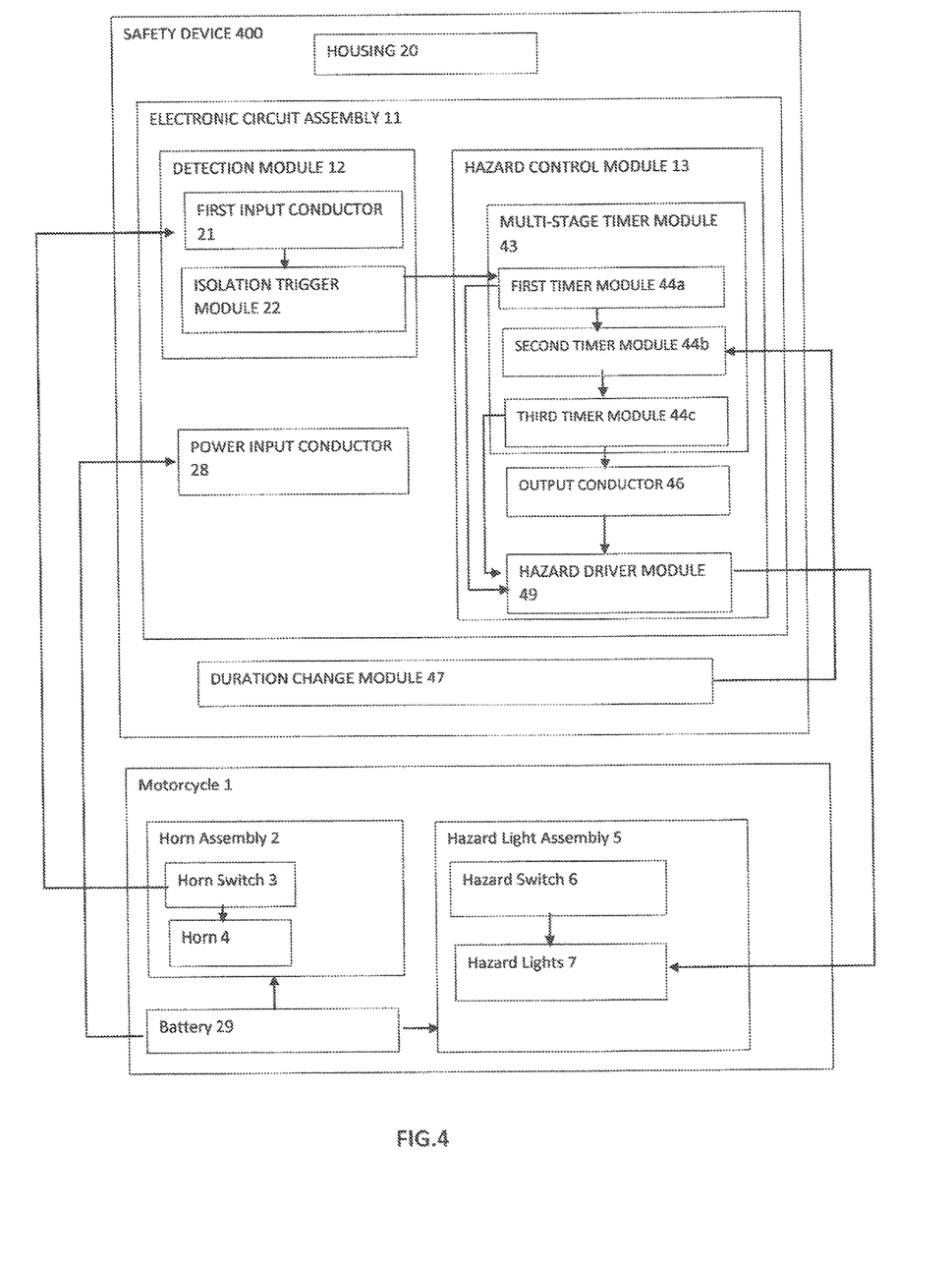
FIG. 4 is a block diagram illustrating a safety device according to another example.

FIG. 4 is a block diagram illustrating a safety device according to another example. Referring to FIG. 4, in some example, a safety device 400 may include a housing 20, an electronic circuit assembly 11, and a duration change module 47. The electronic circuit assembly 11 may include a power input conductor 28, a detection module 12 and a hazard control module 13. In some examples, the housing 20 attaches to the motorcycle 1 and the electronic circuit assembly 11 is disposed in the housing 20. The electronic circuit assembly 11 may include a substrate with electronic components formed and/or attached thereon such as a printed circuit board, a printed circuit assembly, and the like.

Referring to FIG. 4, the power input conductor 28 may receive power from a battery 29 of the motorcycle 1 to power the electric circuit assembly 11. The battery 29 may also power the motorcycle 1 including the horn assembly 2 and hazard light assembly 5. In some examples, the safety device 400 includes a manual switch to selectively connect and disconnect power to the electric circuit assembly 11 to place the safety device 400 in an operational mode and a non-operational mode.

Referring to FIG. 4, the detection module 12 may include a first input conductor 21 and an isolation trigger module 22. The first input conductor 21 receives a horn signal based on the activation of the horn assembly 2 by the engagement of the horn switch 3 by the user. The isolation trigger module 22 provides an isolation trigger signal to activate the hazard control module 13 in response to the horn signal. The isolation trigger module 22 may also reduce a false activation of the hazard light assembly 5.

Referring to FIG. 4, the hazard control module 13 may include a multi-stage timer module 43, a hazard driver module 49, and an output conductor 46. In some examples, the multi-stage timer module 43 provides multi-stage trigger signals. The multi-stage timer module 43 may include first timer module 44a, a second timer module 44b, and a third timer module 44c. The first timer module 44a provides a first trigger signal for a first time period of the duration period to the second timer module 44b and also to the hazard driver module 49 in response to the isolation trigger signal from the isolation trigger module 22 of the detection module 13.

The second timer module 44b receives the first trigger signal. The second timer module 44b provides a second trigger signal after a second time period from the first trigger signal being received. The third timer module 44c receives the second trigger signal from the second timer module 44b. The third timer module 44c automatically provides a third trigger signal to the hazard driver module 49 in response to the end of the duration period. The hazard driver module 49 communicates with the multi-stage timer module 43 and the hazard light assembly 5. The hazard driver module 49 places the hazard lights 7 in the on state and the off state, for example, through the output conductor 46 based on the respective multi-stage trigger signals from the multi-stage timer module 43.

Referring to FIG. 4, the output conductor 46, the first input conductor 21 and the power input conductor 28 may be in the form of an input/output port 52 (FIG. 5) to communicate with the motorcycle 1. The output conductor 46 may communicate with the hazard light assembly 5 of the motorcycle 1. For example, the output conductor 46 may provide a hazard signal to the hazard light assembly 5 to turn on the hazard lights 7 based on receiving the first trigger signal from the first timer module 44a. Additionally, the output conductor 46 may provide a subsequent hazard signal to the hazard lights assembly 5 to turn off the hazard lights 7 based on the third trigger signal from the third timer module 44c being received.

Referring to FIG. 4, the duration change module 47 may increase and decrease an amount of the duration period by the user. The duration change module 47 may provide the amount of increase and decrease of the duration period to the multi-stage timer module 43. That is, the duration change module 47 may provide at least one of the amount of increase and decrease of the duration period to the second timer module 44b to set the second time period.

Figure 5:
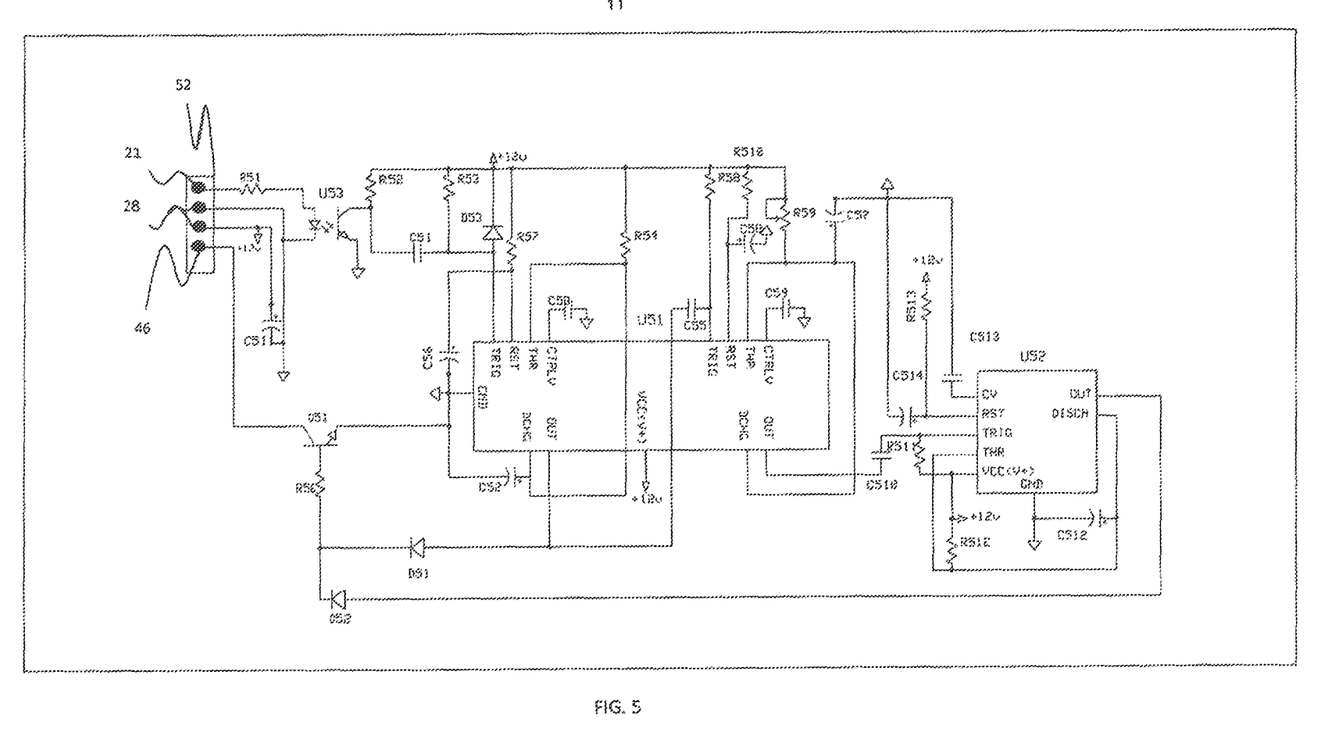
FIG. 5 is a schematic view illustrating an electronic circuit assembly including an electronic circuit of the safety device of FIG. 4 according to another example.

FIG. 5 is a schematic view illustrating an electronic circuit assembly including an electronic circuit of the safety device of FIG. 4 according to another example. Referring to FIGS. 4-5, in some examples, the electronic circuit assembly 11 includes a power input conductor 28, a detection module 12, and a hazard control module 13. The detection module 12 may include a first input conductor 21 and an isolation trigger module 22. The first input conductor 21, the power input conductor 28, and an output conductor 46 may be in the form of an input/output port 52 to communicate with the motorcycle 1.

For example, the first input conductor 21 may communicate with the horn switch 3, the power input conductor 28 may communicate with the battery 29, and the output conductor 46 may communicate with the hazard light assembly 5 of the motorcycle 1. That is, the first input conductor 21 may receive a horn signal in response to an engagement of the horn switch 3 by the user. The power input conductor 28 may be a pair of electrically-conductive terminals to receive power from the battery 29 and to provide power to the electronic circuit assembly 11. The battery 29 may also provide power to the horn assembly 2 and hazard light assembly 5 of the motorcycle 1. The output conductor 46 may output a respective hazard signal to the hazard light assembly 5 to enable the hazard lights 7 to be placed between an on state and an off state.

Referring to FIGS. 4-5, the isolation trigger module 22 includes resistors R51, R52, and R53, a capacitor C51, and a photo-coupler IC U53. Photo-coupler IC 53 is turned on by a current established through resistor R51 in response to a horn signal provided thereto based on the engagement of the horn switch 3 by a user. In the on state, the photo-coupler IC U53 discharges capacitor C51 and, as a result, changes the state of the trigger input pin TRIG of the first timer module 44a from high to low. In other words, the isolation trigger module 22 provides an isolation trigger signal to activate the first timer module 44a. Resistors R52 and R53 and diode D3 enable proper triggering of the first timer module 44a at the trigger input pin TRIG.

Referring to FIGS. 4-5, the hazard control module 13 may include a multi-stage timer module 43 and a hazard driver module 49. The multi-stage timer module 43 may include a first timer module 44a, a second timer module 44b, and a third timer module 44c. The first timer module 44a may include a first portion of a multi-stage timer integrated circuit (IC) U51, resistors R54, R57, and R58, and capacitors C52, C53, C55, and C56. Capacitor C53 may maintain the predetermined voltage constant at the control voltage pin CTRL V of the first portion of multi-stage timer IC U51. C55 and R58 may enable proper triggering of the second portion of the multi-stage timer IC U51 based on a first trigger signal output at the output pin OUT of the first portion of the multi-stage timer IC U51. Capacitor C56 and resistor R57 may maintain the predetermined voltage constant at the reset pin RST of the first timer portion of the multi-stage timer IC U51. Capacitor C52 and resistor R54 determine a first time period of the first trigger signal output from the first portion of the multi-stage timer IC U51. In some examples, the first time period may be approximately 1.1 seconds.

The second timer module 44b may include a second portion of the multi-stage timer IC U51, resistors R510 and R511, a variable resistor R59, and capacitors C57, C58, C59, and C510. C59 may maintain the predetermined voltage constant at the control voltage pin CTRL V of the second portion of the multi-stage timer IC U51. C510 and R511 may enable proper triggering at trigger pin TRIG of the timer IC U52 based on a second trigger signal from an output pin OUT of the second portion of the multi-stage IC U51. Capacitor C58 and resistor R510 may maintain the predetermined voltage constant at the reset pin RST of the second timer portion of the multi-stage IC U51. Capacitor C57 and variable resistor R59 determine a second time period of the second trigger signal output at output pin OUT from the second portion of the multi-stage timer IC U51.

The third timer module 44c may include a timer IC U52, resistors R512 and R513, and capacitors C512, C513, and C514. Capacitor C513 may maintain the predetermined voltage constant at the control voltage pin CV of the timer IC U52. C55 and R58 may enable proper triggering of the second portion of the multi-stage IC U51 based on a first trigger signal output at the output pin OUT of the first portion of the multi-stage IC U51. Capacitor C514 and resistor R513 may maintain the predetermined voltage constant at the reset pin RST of the timer IC U52. Capacitor C512 and resistor R512 set a third time period of a third trigger signal at output pin OUT output from the timer IC U51. Timer IC U52 and Multi-stage timer IC U51 may include a respective voltage pin (V+, Vcc) to receive a supply voltage, a threshold pin THR to monitor voltage across a respective capacitor, and discharge pin DCHG to discharge the respective capacitor. The respective threshold pin THR and respective discharge pin DCHG may be connected to each other. The capacitors for the hazard control module 13 may include ceramic capacitors, electrolytic capacitor, and the like.

Referring to FIGS. 4-5, in some examples the hazard driver module 49 may include a transistor Q51, an output conductor 46, and diodes D51 and D52. The transistor Q51 may be selectively activated by the first trigger signal provided by the first timer portion of the multi-stage timer IC U51 at output pin OUT and the third trigger signal provided by the timer IC U52 at output pin OUT. Diodes D1 and D2 prevent unwanted current from damaging and/or falsely triggering unintended components upstream from the transistor Q51. The output conductor 46 may communicate with the hazard light assembly 5 of the motorcycle 1. For example, the output conductor 46 may output a respective hazard signal, for example, to a flasher unit and/or microprocessor of the hazard light assembly 5. A respective hazard signal enables a pulse train signal to turn on the hazard lights 7 in a flashing sequence in the on state. Whereas, a subsequent respective hazard signal disables the pulse train signal to turn off the hazard lights 7 in the off state.

Figure 6:
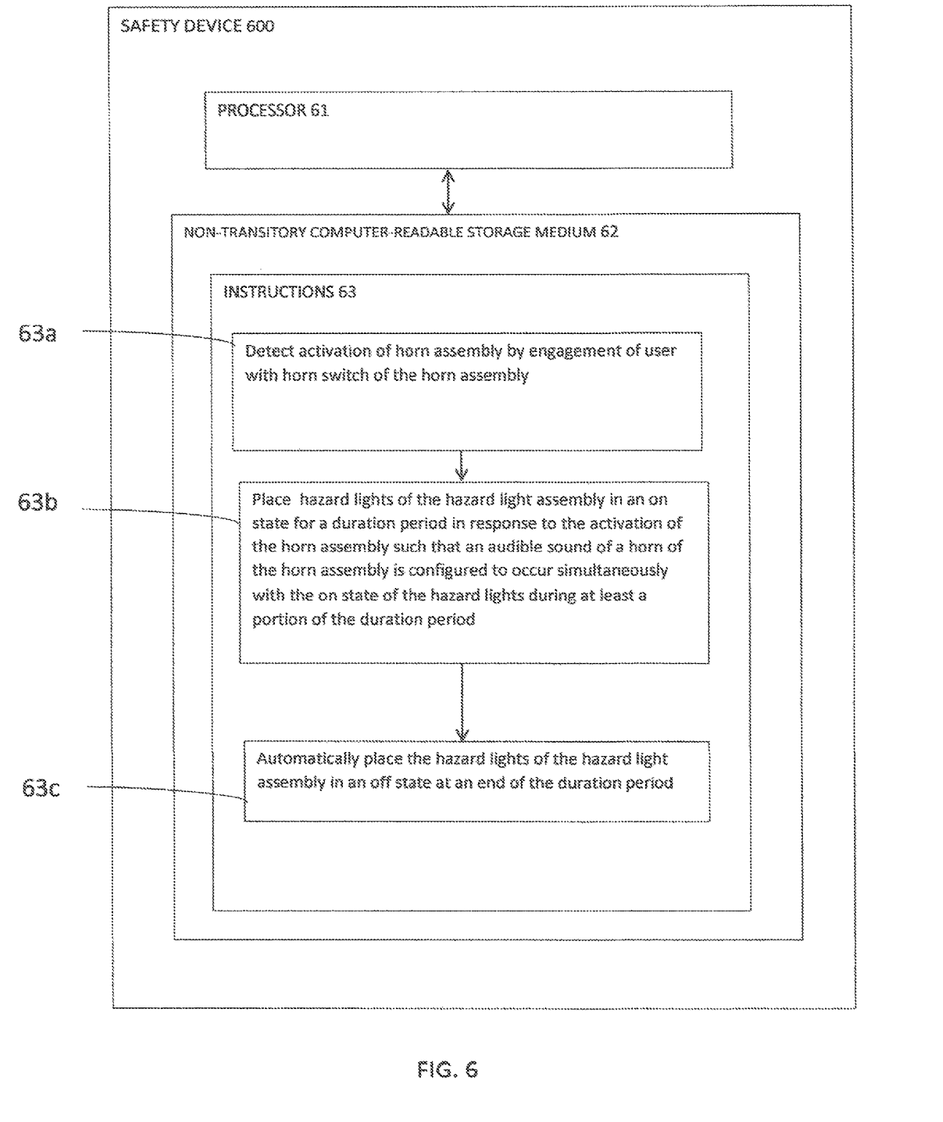
FIG. 6 is a block diagram illustrating a computing device such as a safety device including a processor and a non-transitory, computer-readable storage medium to store instructions to operate a safety device according to an example.

FIG. 6 is a block diagram illustrating a computing device such as a safety device including a processor and a non-transitory, computer-readable storage medium to store instructions to operate a safety device usable with a motorcycle having a horn assembly and a hazard light assembly according to an example. The safety device 600 may include a detection module 12 (FIG. 1) and a hazard control module 13 (FIG. 1) according to an example. Referring to FIG. 6, in some examples, the non-transitory, computer-readable storage medium 62 may be included in a computing device such as the safety device 600. In some examples, the non-transitory, computer-readable storage medium 62 may be implemented in whole or in part as instructions 63 such as computer-implemented instructions stored in the computing device such as a safety device 600 locally or remotely, for example, in a server or a host computing device.

Referring to FIG. 6, in some examples, the detection module 12 (FIG. 1) and/or hazard control module 13 (FIG. 1) may be implemented in whole or in part as instructions 63. In some examples, the instructions 63 may include in whole or in part, a first respective instruction 63a, a second respective instruction 63b, and a third respective instruction 63c. The first respective instruction 63a may be to detect the activation of the horn assembly by engagement of a user with a horn switch of the horn assembly. The second respective instruction 63b may be to place a plurality of hazard lights of the hazard light assembly in an on state for a duration period in response to the activation of the horn assembly such that an audible sound of a horn of the horn assembly is configured to occur simultaneously with the on state of the hazard lights during at least a portion of the duration period. The third respective instruction 63c may be to automatically place the plurality of hazard lights of the hazard light assembly in an off state at an end of the duration period.

Referring to FIG. 6, in some examples, the non-transitory, computer-readable storage medium 62 may correspond to a storage device that stores instructions 63, such as computer-implemented instructions and/or programming code, and the like. For example, the non-transitory, computer-readable storage medium 62 may include a non-volatile memory, a volatile memory, and/or a storage device. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM).

Referring to FIG. 6, examples of storage devices include, but are not limited to, hard disk drives, compact disc drives, digital versatile disc drives, optical drives, and flash memory devices. In some examples, the non-transitory, computer-readable storage medium 62 may be a suitable medium upon which the instructions 63 are printed, as the instructions 63 can be electronically captured, via, for instance, optical scanning of the paper or other medium, then compiled, interpreted or otherwise processed in a single manner, if necessary, and then stored therein. A processor 61 generally retrieves and executes the instructions 63 stored in the non-transitory, computer-readable storage medium 62, for example, to operate a computing device such as the safety device 600. In an example, the non-transitory, computer-readable storage medium 62 can be accessed by the processor 61.

Figure 7:
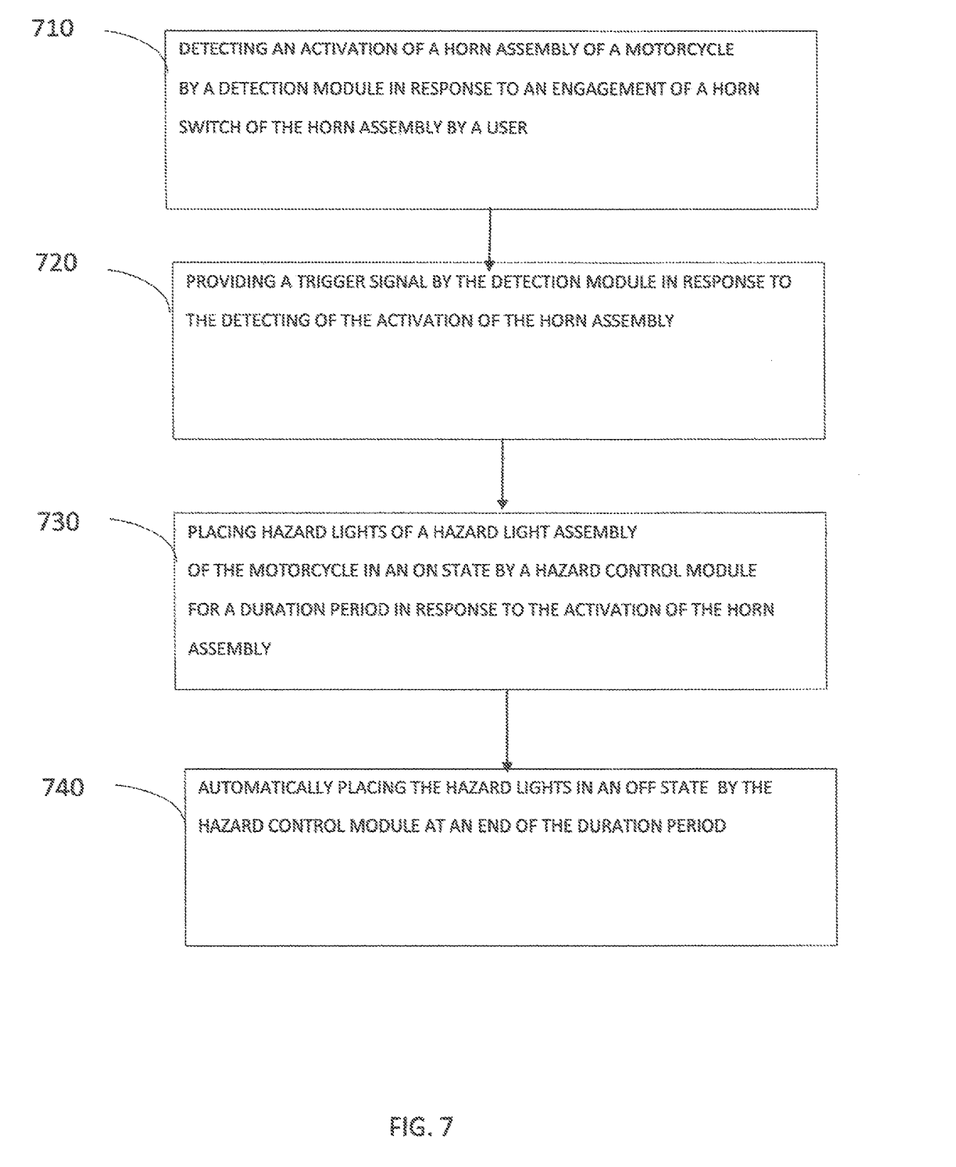
FIG. 7 is a flowchart illustrating a safety method according to an example.

FIG. 7 is a flowchart illustrating a safety method according to an example. In block 710, an activation of a horn assembly of a motorcycle is detected by a detection module in response to an engagement of a user with a horn switch of the horn assembly. For example, a horn signal is received by a first input conductor based on the activation of the horn assembly by the engagement of the horn switch by the user. In block 720, a trigger signal is provided by the detection module in response to the detecting of the activation of the horn assembly. For example, an activation of the hazard control module is triggered by an isolation trigger module in response to the horn signal and to reduce a false activation of the hazard light assembly.

In block 730, a plurality of hazard lights of a hazard light assembly of the motorcycle is placed in an on state by a hazard control module for a duration period in response to the activation of the horn assembly. For example, the duration period is established by a timer module and the plurality of hazard lights is placed in the on state by the relay module in response to the trigger. Alternatively, in some examples, a multi-stage timer module places the plurality of hazard lights in the on state in response to the trigger signal of the detection module. In some examples, an audible sound of a horn of the horn assembly is configured to occur simultaneously with the on state of the plurality of hazard lights during at least a portion of the duration period in response to the activation of the horn switch.

In block 740, the plurality of hazard lights is automatically placed in an off state by the hazard control module at an end of the duration period. In some examples, a relay module automatically places the plurality of hazard lights in the off state in response to the end of the duration period. Yet, in other examples, a multi-stage timer module automatically places the plurality of hazard lights in the off state in response to the end of the duration period.

Figure 8:
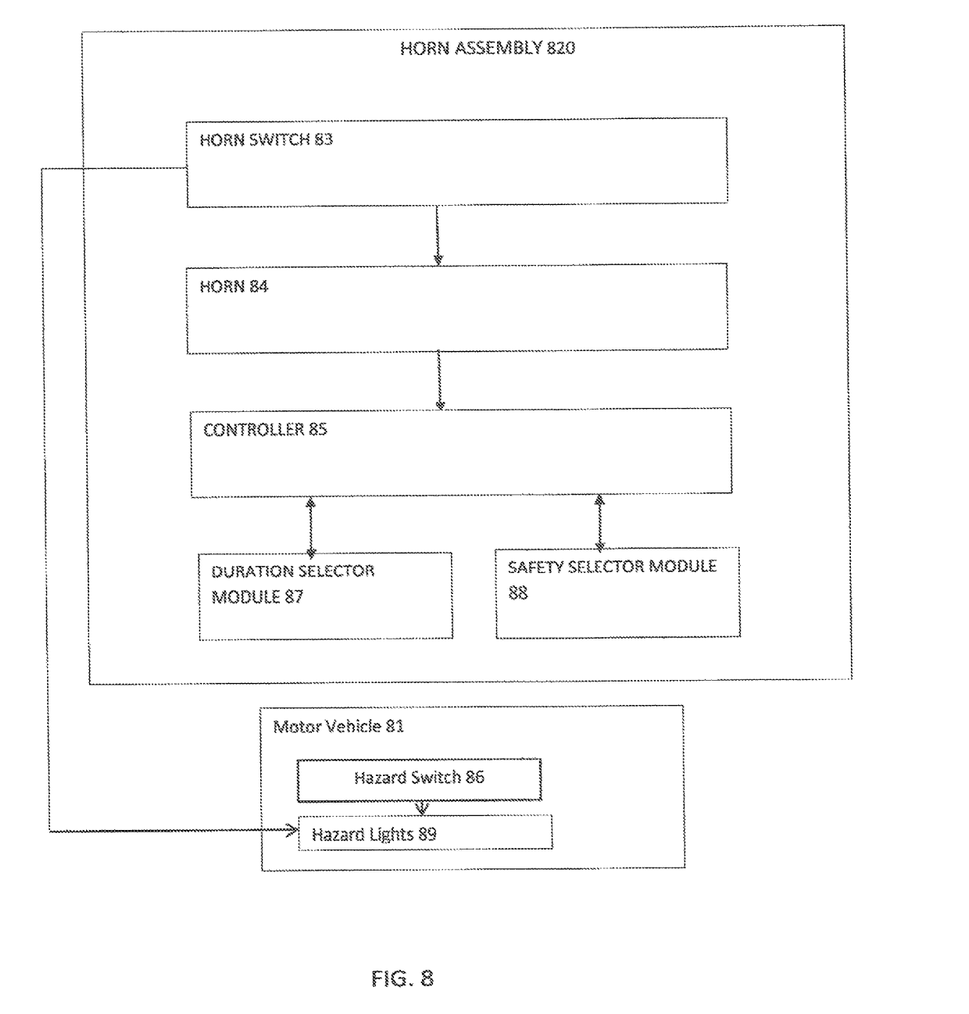
FIG. 8 is a block diagram illustrating a horn assembly usable with a motor vehicle having hazard lights according to an example.

FIG. 8 is a block diagram illustrating a horn assembly for a motor vehicle having a plurality of hazard lights according to an example. The motor vehicle 81 may include an automobile, a motorcycle, and the like. Referring to FIG. 8, in some examples, a horn assembly 820 includes a horn switch 83, a horn 84, a safety selector module 88, a controller 85, and a duration selector module 87. The horn switch 83 is engageable by a user to activate the horn 84. In response to activation, the horn 84 produces an audible sound. The safety selector module 88 includes a normal state and an enhanced safety state selectable by a user.

In the normal state, the horn 84 is activated/deactivated and the hazard lights 89 are placed in an on state and an off state in the typical manner. That is, in the normal state, the hazard lights 89 are not placed in an on state by the engagement of the horn switch 83, but through the engagement of the hazard switch 86. Further, in the normal state, the hazard lights 89 are not automatically placed in the off state, but through a subsequent engagement of the hazard switch 83 by the user. In enhanced safety state, a single engagement of the horn switch 83 by the user immediately activates, both, the horn 84 (horn 84 deactivated after release of horn switch 83 in a traditional manner) and places the hazard lights 89 in an on state and, after a duration period, automatically places the hazard lights 89 in an off state. Further, the enhanced safety state still enables a user to independently use the hazard switch 86 in the traditional manner, if necessary. Also, in some examples, the horn switch 83 may send a signal to a processor which communicates with the horn 84 to enable the horn 84 to emit the audible sound in the normal state and/or the enhanced safety state.

Referring to FIG. 8, in some examples, the controller 85 detects an engagement of the horn switch 83 and the enhanced safety state of the safety selector module 88. The controller 85 also places the hazard lights 89 in an on state to illuminate in a flashing sequence for a duration period in response to the engagement of the horn switch 83 by the user and a placement of the safety selector module 88 in the enhanced safety state. The duration selector module 87 may include a plurality of duration states selectable by the user such that each duration state corresponds to a specific amount of time for the duration period. The duration selector module 87 may provide a respective duration state to the controller 85.

In some examples, the safety selector module 88 and/or controller 85 may be implemented in hardware, software including firmware, or combinations thereof. The firmware, for example, may be stored in memory and executed by a suitable instruction-execution system. If implemented in hardware, as in an alternative example, the safety selector module 88 and/or controller 85 may be implemented with any or a combination of technologies which are well known in the art (for example, discrete-logic circuits, application-specific integrated circuits (ASICs), programmable-gate arrays (PGAs), field-programmable gate arrays (FPGAs)), and/or other later developed technologies. In some examples, the safety selector module 88 and/or the controller 85 may be implemented in a combination of software and data executed and stored under the control of a computing device.

Figure 9:
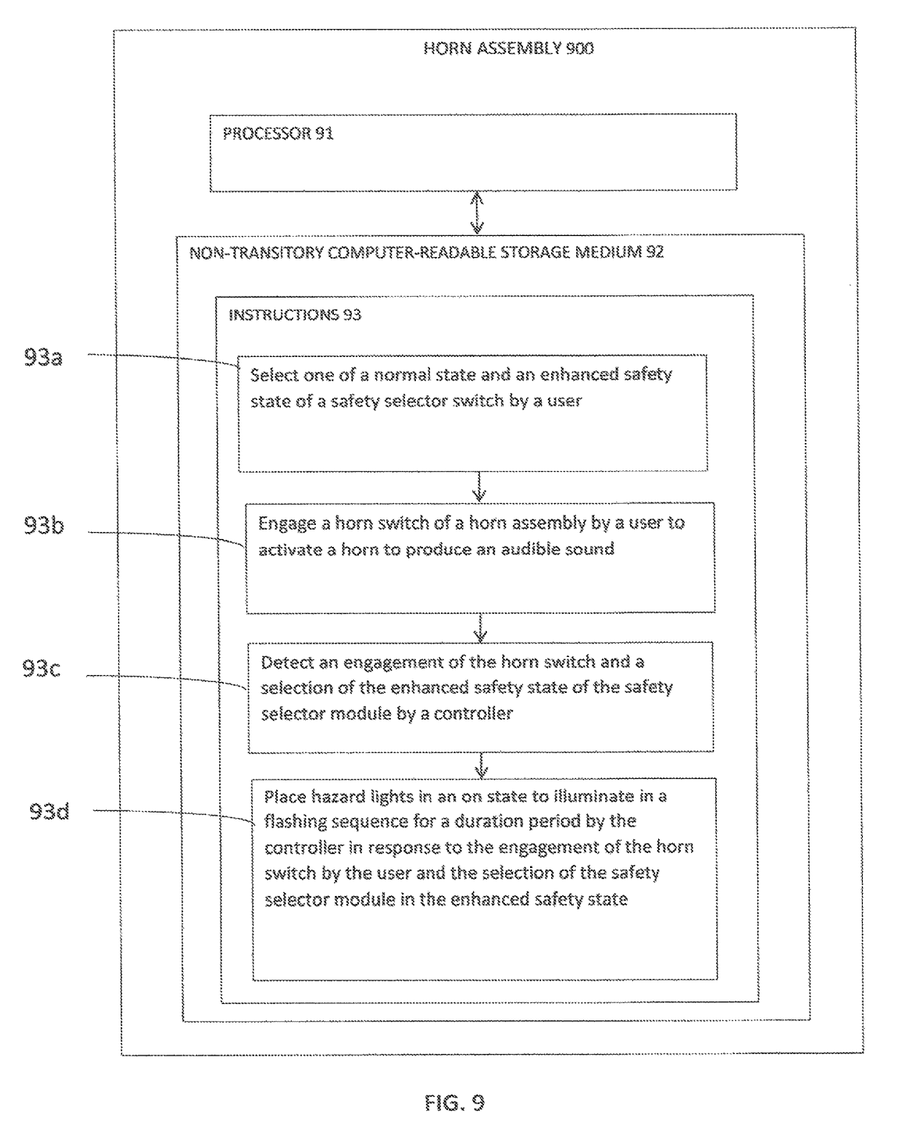
FIG. 9 is a block diagram illustrating a computing device such as a horn assembly including a processor and a non-transitory, computer-readable storage medium to operate a horn assembly according to an example.

FIG. 9 is a block diagram illustrating a computing device such as a horn assembly including a processor and a non-transitory, computer-readable storage medium to operate a horn assembly usable with a motor vehicle having a plurality of hazard lights according to an example. Referring to FIG. 9, in some examples, the non-transitory, computer-readable storage medium 92 may be included in a computing device such as a horn assembly 900. In some examples, the non-transitory, computer-readable storage medium 92 may be implemented in whole or in part as instructions 93 such as computer-implemented instructions stored in the computing device such as the horn assembly 900 locally or remotely, for example, in a server or a host computing device.

Referring to FIG. 9, in some examples, the instructions 93 may include in whole or in part, a first respective instruction 93a, a second respective instruction 93b, a third respective instruction 93c, and a fourth respective instruction 93d. The first respective instruction 93a may be to select one of a normal state and an enhanced safety state of a safety selector switch by a user. The second respective instruction 93b may be to engage a horn switch of the horn assembly by a user to activate the horn to produce an audible sound. The third respective instruction 93c may be to detect an engagement of the horn switch and a selection of the enhanced safety state of the safety selector module by the controller. The fourth respective instruction 93d may be to place the plurality of hazard lights in an on state to illuminate in a flashing sequence for a duration period by the controller in response to the engagement of the horn switch by the user and the selection of the safety selector module in the enhanced safety state.

Referring to FIG. 9, in some examples, the non-transitory, computer-readable storage medium 92 may correspond to a storage device that stores instructions 93, such as computer-implemented instructions and/or programming code, and the like. For example, the non-transitory, computer-readable storage medium 92 may include a non-volatile memory, a volatile memory, and/or a storage device. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM).

Referring to FIG. 9, examples of storage devices include, but are not limited to, hard disk drives, compact disc drives, digital versatile disc drives, optical drives, and flash memory devices. In some examples, the non-transitory, computer-readable storage medium 92 may be a suitable medium upon which the instructions 93 are printed, as the instructions 93 can be electronically captured, via, for instance, optical scanning of the paper or other medium, then compiled, interpreted or otherwise processed in a single manner, if necessary, and then stored therein. A processor 91 generally retrieves and executes the instructions 93 stored in the non-transitory, computer-readable storage medium 92, for example, to operate a computing device such as the horn assembly 900. In an example, the non-transitory, computer-readable storage medium 92 can be accessed by the processor 91.

Figure 10:
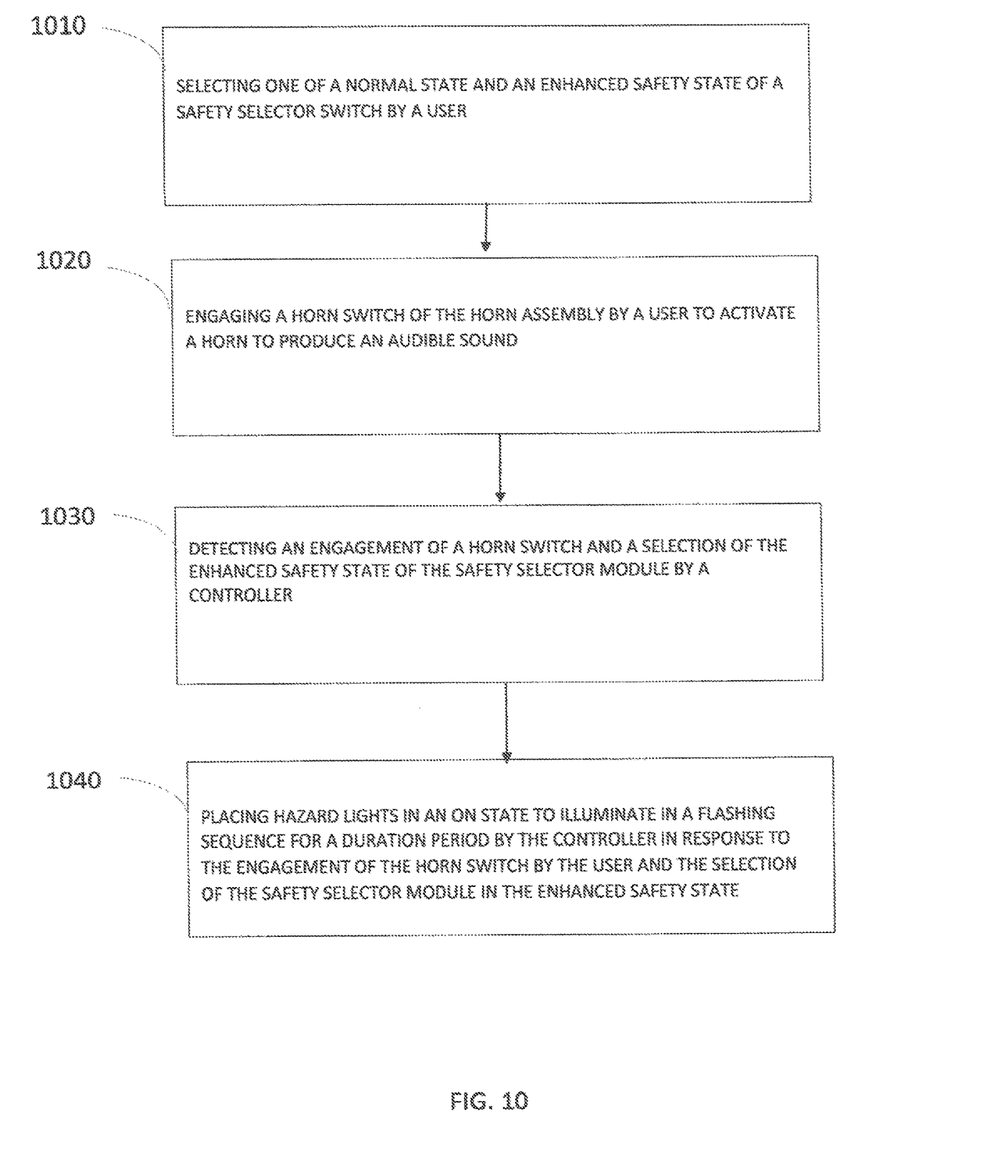
FIG. 10 is a flowchart illustrating a horn operation method according to an example.

FIG. 10 is a flowchart illustrating a horn operating method according to an example. The method may include operating a horn assembly of a motor vehicle having a plurality of hazard lights according to an example. In block 1010, one of a normal state and an enhanced safety state of a safety selector switch is selected by a user. In block 1020, a horn switch of a horn assembly is engaged by a user to activate the horn to produce an audible sound. In block 1030, an engagement of the horn switch and a selection of the enhanced safety state of the safety selector module are detected by the controller. In block 1040, the plurality of hazard lights is placed in an on state to illuminate in a flashing sequence for a duration period by the controller in response to the engagement of the horn switch by the user and the selection of the safety selector module in the enhanced safety state. In some examples, the duration period may be set by a user through a duration selector module to communicate with the controller.

It is to be understood that the flowchart of FIGS. 7 and 10 illustrate architecture, functionality, and/or operation of examples of the present disclosure. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowcharts of FIGS. 7 and 10 illustrate a specific order of execution, the order of execution may differ from that which is depicted. For example, the order of execution of two or more blocks may be rearranged relative to the order illustrated. Also, two or more blocks illustrated in succession in FIGS. 7 and 10 may be executed concurrently or with partial concurrence. All such variations are within the scope of the present disclosure.

The present disclosure has been described using non-limiting detailed descriptions of examples thereof that are not intended to limit the scope of the general inventive concept. It should be understood that features and/or operations described with respect to one example may be used with other examples and that not all examples have all of the features and/or operations illustrated in a particular figure or described with respect to one of the examples. Variations of examples described will occur to persons of the art. Furthermore, the terms "comprise," "include," "have" and their conjugates, shall mean, when used in the disclosure and/or claims, "including but not necessarily limited to."

It is noted that some of the above described examples may include structure, acts or details of structures and acts that may not be essential to the general inventive concept and which are described for illustrative purposes. Structure and acts described herein are replaceable by equivalents, which perform the same function, even if the structure or acts are different, as known in the art. Therefore, the scope of the general inventive concept is limited only by the elements and limitations as used in the claims.

What is claimed is:

1. A safety device usable with a motorcycle having a horn assembly and a hazard light assembly, the safety device comprising:
    a hazard control module to place a plurality of hazard lights of the hazard light assembly in an on state for a duration period in response to an activation of the horn assembly and to automatically place the plurality of hazard lights in an off state at an end of the duration period; and
    a detection module to detect the activation of the horn assembly by an engagement of a horn switch of the horn assembly by a user and to provide a trigger signal to activate the hazard control module.

2. The safety device of claim 1, wherein an audible sound of a horn of the horn assembly is configured to occur simultaneously with the on state of the plurality of hazard lights during at least a portion of the duration period in response to the activation of the horn switch.

3. The safety device of claim 1, further comprising:
    a housing attachable to the motorcycle; and
    an electronic circuit assembly disposed in the housing, the electronic circuit assembly including the hazard control module and the detection module.

4. The safety device of claim 1, wherein the detection module comprises:
    a first input conductor to receive a horn signal based on the activation of the horn assembly by the engagement of the horn switch by the user; and
    an isolation trigger module to provide the trigger signal to activate the hazard control module in response to the horn signal.

5. The safety device of claim 1, wherein the hazard control module comprises:
    a timer module to provide a timer trigger signal and the duration period thereof; and
    a relay module to place the plurality of hazard lights in the on state in response to the timer trigger signal and to automatically place the plurality of hazard lights in the off state in response to the end of the duration period.

6. The safety device of claim 5, wherein the relay module comprises:
    a second input conductor to receive a flashing signal from the hazard light assembly; and
    a first output conductor to place the plurality of hazard lights in the on state in response to the timer trigger signal and the flashing signal, and to automatically place the plurality of hazard lights in the off state at the end of the duration period.

7. The safety device of claim 1, further comprising:
    a duration selector module having a plurality of duration states selectable by the user such that each duration state corresponds to a specific amount of time for the duration period, the duration selector module is configured to provide a respective duration state to the timer module.

8. The safety device of claim 7, wherein at least one of the duration states selectable by the user is configured to cause the plurality of hazard lights to flash as a one-time burst of light.

9. The safety device of claim 1, wherein the hazard control module comprises:
    a multi-stage timer module to provide multi-stage trigger signals; and
    a hazard driver module to communicate with the multi-stage timer module and the hazard light assembly, the hazard driver module to place the plurality of hazard lights in the on state and the off state based on the respective multi-stage trigger signals from the multi-stage timer module.

10. The safety device of claim 9, wherein the multi-stage timer module comprises:
    a first timer module to provide a first trigger signal for a first time period of the duration period to the hazard driver module in response to receiving the trigger signal from the detection module;
    a second timer module to receive the first trigger signal, the second timer module to provide a second trigger signal after a first time period in response to receiving the first trigger signal; and
    a third timer module to receive the second trigger signal from the second timer module, the third timer module to automatically provide a third trigger signal to the hazard driver module in response to the end of the duration period.

11. The safety device of claim 9, wherein the hazard driver module comprises:
    an output conductor to place the plurality of hazard lights in the on state in response to a respective one of the multi-stage trigger signals and to automatically place the plurality of hazard lights in the off state at the end of the duration period in response to another one of the multi-stage trigger signals.

12. The safety device of claim 9, further comprising:
    a duration change module to at least one of increase and decrease an amount of the duration period by the user, the duration change module is configured to provide the at least one of the amount of increase and decrease of the duration period to the multi-stage timer module.

13. A non-transitory computer-readable storage medium having computer executable instructions stored thereon to operate a safety device usable with a motorcycle having a horn assembly and a hazard light assembly, the instructions are executable by a processor to:
    detect an activation of the horn assembly by engagement of a user with a horn switch of the horn assembly;
    place a plurality of hazard lights of the hazard light assembly in an on state for a duration period in response to the activation of the horn assembly such that an audible sound of a horn of the horn assembly is configured to occur simultaneously with the on state of the hazard lights during at least a portion of the duration period; and
    automatically place the plurality of hazard lights of the hazard light assembly in an off state at an end of the duration period.

14. A safety method comprising:
    detecting an activation of a horn assembly of a motorcycle by a detection module in response to an engagement of a user with a horn switch of the horn assembly;
    providing a trigger signal by the detection module in response to the detecting the activation of the horn assembly;

placing a plurality of hazard lights of a hazard light assembly of the motorcycle in an on state by a hazard control module for a duration period in response to the activation of the horn assembly; and automatically placing the plurality of hazard lights in an off state by the hazard control module at an end of the duration period.

15. A horn assembly usable with a motor vehicle having a plurality of hazard lights, the horn assembly comprising:

a horn to produce an audible sound;

a horn switch engageable by a user to activate the horn;

a safety selector module having a normal state and an enhanced safety state selectable by a user; and a controller to detect an engagement of the horn switch and a selection of the enhanced safety state of the safety selector module, the controller to place the plurality of hazard lights in an on state to illuminate in a flashing sequence for a duration period in response to the engagement of the horn switch by the user and the selection of the safety selector module in the enhanced safety state.

\* \* \* \* \*